United States Patent
Winn et al.

(10) Patent No.: US 6,447,687 B1
(45) Date of Patent: Sep. 10, 2002

(54) DEWATERING OF SEWAGE SLUDGE

(75) Inventors: Edward H Winn, Marietta, GA (US); Dewey W Hunter, Chesapeake, VA (US)

(73) Assignee: Ciba Specialty Chemcials Water Treatments Ltd., Bradford (GB)

( * ) Notice: Subject to any disclaimer, the term of this patent is extended or adjusted under 35 U.S.C. 154(b) by 0 days.

(21) Appl. No.: 09/403,880

(22) PCT Filed: Apr. 30, 1998

(86) PCT No.: PCT/GB98/01269

§ 371 (c)(1), (2), (4) Date: Oct. 27, 1999

(87) PCT Pub. No.: WO98/49108

PCT Pub. Date: Nov. 5, 1998

Related U.S. Application Data

(60) Provisional application No. 60/044,437, filed on Apr. 30, 1997.

(51) Int. Cl.[7] ............................................... C02F 11/14
(52) U.S. Cl. ..................... 210/709; 210/712; 210/710; 210/734; 210/195.1; 210/196
(58) Field of Search ................... 210/609, 614, 210/709, 712, 725, 727, 728, 738, 739, 96.1, 101, 195.1, 196, 199, 202, 205, 206, 710, 734

(56) References Cited

U.S. PATENT DOCUMENTS

| | | | | |
|---|---|---|---|---|
| 3,577,341 A | * | 5/1971 | Keith, Jr. et al. | 210/727 |
| 4,402,837 A | * | 9/1983 | Bastgen et al. | 210/712 |
| 4,792,406 A | * | 12/1988 | Allenson et al. | 210/734 |
| 5,075,012 A | | 12/1991 | Busse | 210/709 |
| 5,248,416 A | | 9/1993 | Howard, Jr. | 210/195.1 |

FOREIGN PATENT DOCUMENTS

| | | | |
|---|---|---|---|
| EP | 03131399 | * | 6/1991 |
| EP | 0571680 A1 | * | 12/1993 |
| EP | 0704699 | * | 8/1995 |
| EP | 07265900 | * | 10/1995 |
| JP | 57-150480 | | 9/1982 |
| JP | 58-146498 | | 9/1983 |
| WO | 96/31265 | | 10/1996 |

* cited by examiner

Primary Examiner—Peter A. Hruskoci
(74) Attorney, Agent, or Firm—David R. Crichton

(57) ABSTRACT

The present invention relates to a sludge treatment plant in which sludge is flocculated and then dewatered to form a cake and a reject liquor is modified by recycling 3 to 40% of the reject liquor into the sludge immediately before the dewatering process.

8 Claims, 2 Drawing Sheets

DEWATERING OF SEWAGE SLUDGE

Figure 1:
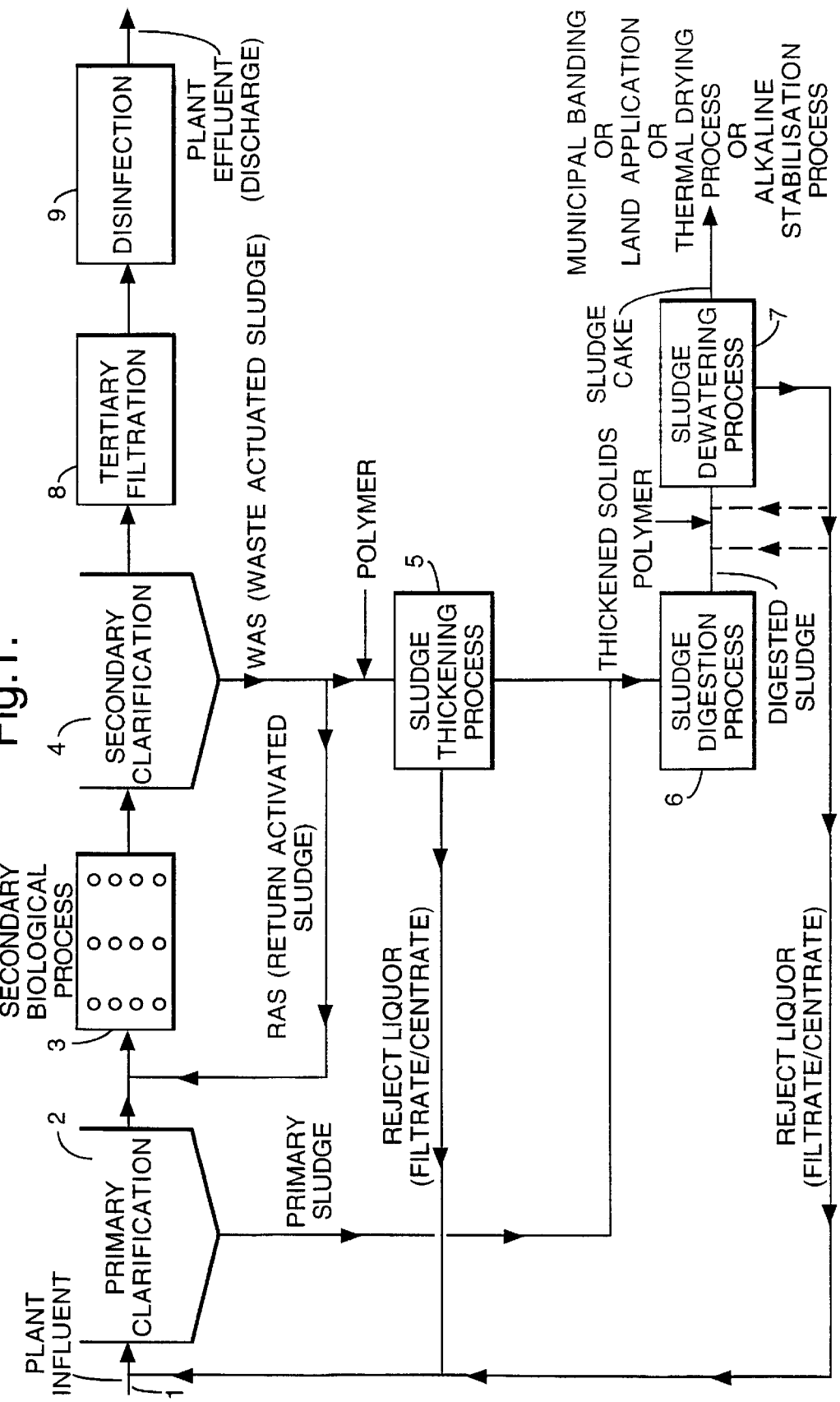

This application claims priority to provisional application No. 60/044,437, filed Apr. 30, 1997.

FIELD OF THE INVENTION

This invention relates to processes and apparatus for dewatering sewage sludge so as to produce a cake and a reject liquor which can be a supernatant, filtrate or centrate.

BACKGROUND TO THE INVENTION

A typical sewage treatment plant takes in raw sewage and produces solids and clarified water. Typically the raw sewage is treated in a primary sedimentation stage to form a primary sludge and supernatant, the supernatant is subjected to biological treatment and then a secondary sedimentation stage to form a secondary sludge and clarified liquor, which is often subjected to further treatment before discharge.

The sludges are usually combined to form a mixed sewage sludge which is then dewatered to form a cake and a reject liquor. The reject liquor is usually recycled to the head of the plant and the start of the process, i.e., fed back to the primary sedimentation stage or a preceding stage in the plant. Any water which is required in the plant, for instance for dissolving polymeric flocculant, is usually either potable water (from the local drinking water supply) or is clarified water from the secondary sedimentation stage, optionally after any subsequent treatment procedures.

It is standard practice to dewater the sludge by mixing a dose of polymeric flocculant into that sludge at a dosing point, and then substantially immediately subjecting the sludge to the dewatering process and thereby forming a cake (typically having a solids content of 15 to 35%) and a reject liquor. The dewatering process may be centrifugation or may be by processes such as filter pressing or belt pressing.

The process is generally conducted so as to obtain the highest possible cake solids, preferably accompanied by the highest possible reject liquor clarity. It is well established that, for any particular performance parameter (such as cake solids) there is an optimum dosage of flocculant and that increasing the dosage above this optimum does not result in an improvement but instead tends to result in overdosing and in deterioration of performance. Accordingly, it can be assumed that polymer applied at dosages of up to the optimum is substantially all adsorbed on to the sludge so as to participate in bridging flocculation, whereas overdosing of polymer is liable to introduce additional polymer into the sludge with the result that excess polymer may remain in the reject liquor and the presence of this excess can interfere with the bridging flocculation performance.

There is a maximum solids loading rate (kg dry matter per hour) and a maximum hydraulic loading rate (liters sludge per hour) which can be handled in any particular dewatering apparatus. It has conventionally been regarded to be desirable normally to operate as close as reasonably practicable to the maximum solids loading rate, and in order that this can be achieved without exceeding the hydraulic loading rate it is necessary that the sludge which is dewatered should have a solids content within an appropriate range. If the sludge would normally have a solids content below this, it is conventional to subject it to a thickening stage (often promoted by the use of polymeric flocculant) before dosing the polymeric flocculant into the resultant sewage sludge substantially immediately prior to the final dewatering intended to form the cake and the reject liquor.

When setting up a dewatering process, it is therefore generally necessary to select the optimum dose and the optimum solids loading rate and hydraulic loading rate.

Thus the optimum combination of solids and hydraulic loading rates is selected to give the most efficient utilisation of the dewatering apparatus having regard to the sludge that is being dewatered. Thereafter, in most cases, it is generally undesirable to dilute the sludge since that increases the hydraulic loading rate without increasing dewatering efficiency.

In other processes, the sludge which is to be dewatered may have a solids content which is too high for optimum results, for instance because the viscosity of the sludge is such that it is difficult to achieve efficient mixing of the flocculant into the sludge and/or to achieve efficient distribution of the flocculated sludge in the dewatering apparatus. Under these circumstances, it is necessary to dilute the sludge prior to dosing the polymeric flocculant into it. The water which is used for dilution is usually the same water as is used for other purposes in the overall plant, namely either water from the drinking water supply or clarified water from the plant.

Various proposals have been made in the literature for recycling various streams to various points in a sewage treatment plant (additional to the normal recycling of the final reject liquor to the head of the plant, as discussed above).

For instance, in U.S. Pat. Nos. 5,075,012 and 5,248,416 a stream of unfiltered liquor which is approaching the dewatering apparatus and which contains flocculated solids is recycled to an earlier point in the feed line so as to promote flocculation of the feed.

When, as mentioned above, it is necessary to thicken the sludge by sedimentation or filtration prior to the final dewatering which forms a cake, the filtrate (or supernatant) from the thickener is sometimes not as clear as is desired. Instead of recycling all of this thickener filtrate or supernatant to the head of the plant, it is known to reuse the thickener supernatant or filtrate for diluting the polymeric flocculant which is added either to promote the thickening or to promote the subsequent dewatering.

In JP-A-57150480 it is proposed to hold effluent in a store tank and subject it to sedimentation in a sedimentation tank into which polymeric flocculant is added. Sludge is taken from the base of this tank and some of the supernatant from the tank is recycled to the store tank so as to dilute the liquor which is being passed to the sedimentation tank. It is alleged that the amount of flocculant which is needed in the sedimentation tank is reduced because of the increased dilution of the solids in that tank, but a disadvantage of this process is that the hydraulic load in the tank is increased.

In JP-A-58146498 sewage sludge, after aeration, is subjected to sedimentation in a sludge concentration tank in which sludge precipitates under gravity. The precipitated sludge is taken to a centrifugal thickener and the supernatant from the centrifugal thickener is combined with the supernatant from the sedimentation tank. The sludge from the centrifugal thickener is dosed with polymeric flocculant and is then subjected to dewatering to provide a cake and a filtrate. It seems that the amount of flocculant which is added is more than would normally be regarded as optimum as it is alleged that, due to the high dosage, large amounts of flocculant are lost with the filtrate and eutrophication is a significant problem in the resultant effluent.

Filtrate from the dewatering apparatus is recycled to the sludge entering the centrifugal thickener and/or to the sludge entering the sedimentation concentration tank and this is alleged to improve the sedimentation and/or thickening. However it should be noted that the only point at which flocculant is added is immediately prior to the dewatering apparatus and that the sedimentation concentration and the centrifugal thickening are both conducted without the deliberate addition of flocculant. Since these processes were being conducted without flocculant and since the filtrate is said to contain wasted flocculant, it is not surprising that adding some of this filtrate to the sludge which is to be subjected to sedimentation and/or centrifugal thickening in the absence of deliberately added flocculant would lead to an improvement in the sedimentation or thickening.

We are concerned with something entirely different, namely achieving a performance in a dewatering process which produces a cake and a reject liquor which is better than a performance which, prior to the invention, would have been regarded as already being optimum in that particular process. Thus, we are concerned inter alia with modifying a process which is already thought to be operating under optimum conditions (having regard to polymer dose, cake solids and reject liquor clarity) and obtaining improved cake solids and/or reject liquor clarity at constant polymer dose or obtaining constant cake solids and/or reject liquor clarity at reduced polymer dose. Clearly, none of the proposals discussed above gives any suggestion as to how to achieve this.

SUMMARY OF THE INVENTION

According to the invention, a sludge treatment process comprises providing a sewage sludge, mixing polymeric flocculant into the sludge at a dosing point, and then substantially immediately subjecting the sludge to a dewatering process and thereby forming a cake and a reject liquor, and in this process 3 to 40% by volume of the reject liquor is recycled into the sludge at a dilution point substantially immediately before the dewatering process.

In normal operation of the process the dose of polymeric flocculant need be no more than the optimum dose of that flocculant for that sludge in that dewatering process without the recycling of the reject liquor.

A sludge treatment plant according to the invention comprises a dewatering apparatus by which sludge can be dewatered into a cake and a reject liquor, a sludge feed line for feeding sewage sludge into the apparatus, and a reject liquor line for leading reject liquor from the apparatus, and a recycling line for recycling reject liquor from the reject liquor line to the sludge feed line.

In this invention the reject liquor may be any type of reject liquor produced by a dewatering process. In particular it can be a supernatant, a filtrate or a centrate.

DESCRIPTION OF PREFERRED EMBODIMENTS

In a simple aspect of the invention a sludge dewatering process is conducted under substantially optimum conditions for that particular sludge and dewatering plant, i.e., at or slightly below optimum polymer dosage and substantially at optimum hydraulic loading rate and solids loading rate so as to obtain the substantially optimum combination of dewatered sludge solids and reject liquor clarity if there is no recycling of reject liquor, and 3 to 40% of the reject liquor is recycled to a dilution point substantially immediately before the dewatering process. As a result, the hydraulic load on the plant is increased (which would generally be thought to be undesirable) but it is found that the cake solids and/or clarity are improved if the dose of flocculant is maintained unchanged.

As a result, it is possible to modify the process by reducing the dose of flocculant and yet obtain cake solids and/or clarity equivalent to what was obtained at the higher dose without the recycling of the reject liquor. Depending upon the objective of the process, it is thus possible either to maximise cake solids and/or reject liquor clarity or to reduce the dose of flocculant, or to obtain a partial reduction in the dose of flocculant and a partial improvement in cake solids and/or reject liquor clarity. Thus, preferred processes for this invention are those where elimination of the recycle would result in reduced cake solids and/or requires additional polymer to maintain cake solids.

In many processes according to the invention, the dose of polymeric flocculant used in the process of the invention is below 95% and often below 90% and sometimes as little as 85 or 80% of the optimum dose under normal operation (i.e., without recycling of the reject liquor). Thus it is possible to achieve a saving in polymer which is easily 5% and can be as much as 15 or 20% while maintaining cake solids and/or reject liquor clarity.

It will be appreciated that the total amount of polymer which is being dosed into the process is generally no greater than, and is often less than, the amount that is required to give optimum bridging flocculation and dewatering in a process without the recycle and so the unexpected advantages in the process cannot be due to reliance on polymer which remains in the liquid phase and which is additional to what is required for optimum dewatering in the corresponding process conducted without recycle.

Further, the percentage reduction in polymer required to give constant cake solids and/or reject liquor clarity is often greater than the total amount of polymer which could, on any basis, be speculated to be present in the recycled reject liquor. For instance, if 10% of the reject liquor is recycled this represents a volume of liquid which would have carried 10% of the initial polymer dose into the dewatering process. Most or all of this initial 10% of the polymer dose would have been utilised in bridging flocculation and so would be trapped in the cake, and so the maximum amount of polymer which could be present in this 10% recycle is far less than 10% and possibly at or near zero, and yet it can typically lead to a reduction of 5 to 20% in the amount of polymer which has to be dosed into the sludge in order to obtain equivalent dewatering. Instead of reducing the amount of polymer, in some instances it can be beneficial to use a less costly and less efficient polymeric flocculant at increased, similar or reduced dosage.

The reason why improved dewatering performance is obtained, including being obtained at increased hydraulic loading rate, is unclear.

The invention also includes processes in which improved dewatering performance is obtained at constant hydraulic loading rate. Thus, in another simple process of the invention, an existing process wherein feed sludge is diluted with potable or clarified water prior to the dewatering process is modified by replacing some or all of this dilution water with recycled reject liquor. For instance there can be 50 to 100% replacement of the dilution water with the recycled reject liquor. The amount of recycled reject liquor (and any dilution water which is still used) is often the same as the original amount of dilution water but can be greater or less, so that the process then has an increased hydraulic load or a decreased hydraulic load when recycling in accordance with the invention. These processes are useful when the sludge naturally has a solids content and viscosity higher than is suitable for normal operation of the admixture of polymeric flocculant and the application of the subsequent dewatering process.

When the invention is applied to an existing process which is already operating with a polymer dose at or below optimum, the invention merely requires the addition of recycle of some of the reject liquor and possible reduction in the amount of polymer, or the use of less polymer or a less efficient (and perhaps less costly) polymeric flocculant. When a process is to be designed from the start in accordance with the invention, it is desirable to select the amount of polymeric flocculant so that it is not more than the optimum for the process without the recycle. In practice the plant operator will probably insist upon this anyway. The method of determining the optimum can be whatever is customary at that plant. It can be on the basis of actual operation of the plant and measurement of cake solids or clarity or a combination of both (depending upon the preference of the plant operator). It can be determined initially by a laboratory test which is known to be indicative of plant performance, for instance a CST test. Subsequent testing on plant of potential systems chosen in this way can establish the optimum type and dose of polymer.

In practice, the precise value of the optimum dose for that sludge in that dewatering process does not have to be determined to great accuracy but instead can be estimated in accordance with the normal accuracy associated with the operation of the plant. The dose used in the invention preferably does not substantially exceed this optimum, as otherwise the economic advantages of the process are reduced or lost, and preferably the dose is 70 to 100% of the optimum, often 80 to 95% of the optimum.

If no other test is established as being preferred at a particular plant, for the purposes of this specification the optimum is established beginning with systems chosen using minimum time as indicated from CST (capillary suction time) tests conducted over a range of doses. Final optimisation is carried out on the plant.

The optimum amount of recycle in any particular process will depend upon the sludge and the other process conditions but is generally at least 5% and usually is not more than 30%, by volume of the reject liquor. The recycling of 30% or higher does not appear to give any further improvement in performance but does give increased hydraulic loading rate, whereas the use of too little recycle does not give sufficient improvement. 7 to 25% is often a suitable range.

The process can be operated with a fixed amount of recycle, but preferably the amount of recycle is varied either to give a constant solids loading rate or to give a constant hydraulic loading rate or to give some predetermined combination of solids loading rate and hydraulic loading rate. Accordingly, the amount of recycle can be varied in response to the rate of supply of the sewage sludge and/or to the dry matter content of the sewage sludge. By this means it is possible not only to obtain the benefits of the invention but also the improved performance that comes from having a more uniform solids loading rate or hydraulic loading rate or both in the dewatering process. Preferably the dry matter content and/or the rate of flow of the sludge is monitored in-line continuously or intermittently and the monitored values are automatically utilised to adjust the amount of recycle, for instance using techniques broadly as described in PCT/GB96/00814.

A conventional sludge treatment plant has a sludge feed line which includes a sludge pump by which the sludge is pumped past the flocculant dosing point (which can in fact include two or more dosing points) and into the dewatering apparatus. The recycle can lead into any point substantially immediately before the dewatering process, i.e., substantially before the inlet to the dewatering apparatus. Accordingly it can be between the dosing point and the dewatering process (or between dosing points if there is more than one such point), between the sludge pump and the dosing point or before the sludge pump. If it is at the polymer dosing point, then the recycle can be used as part or all of the dilution water for the polymeric flocculant in which event the process may be operated without any increased hydraulic loading rate and may consist merely of the use of the recycle for polymer dilution instead of water from the drinking water supply or clarified water for polymer dilution. Preferably, however, the recycle is to a point before the dosing point. Preferably the recycle is to the suction side of the sludge pump, either direct into the pump or into the sludge line ahead of but close to the pump.

The recycle point (and the polymer dosing point) must both be substantially immediately before the inlet to the dewatering plant since it is well known that the benefits of adding treatment chemicals to a material which is to be dewatered are generally lost if the addition of the treatment chemical is conducted too long before the start of the dewatering process. Thus the point at which the recycle is added to the sludge feed and the point at which the polymer is added to the sludge feed are generally both such that the sludge enters the dewatering apparatus within a few seconds or, at the most, a few minutes after the addition. Typically therefore the recycle and the addition of the polymer are both conducted at a time which is less than 10 minutes and usually less than 5 minutes and most preferably less than 2 minutes before the time when the sludge enters the dewatering apparatus.

The method of recycle should be conducted in such a manner that the amount of recycle can easily be controlled accurately and such that it is substantially unaffected by back pressure from the sludge line into the recycling line. This difficulty is minimised when, as is preferred, the recycle is to the suction side of the sludge pump but if the recycle is to the sludge line between the pump and the dewatering apparatus it may be necessary to install an arrangement which will ensure that the desired controlled amount of recycle into the sludge can be introduced against the prevailing pressure.

The dewatering apparatus can be any suitable apparatus by which sewage sludge can be dewatered to form a cake and a reject liquor. Thus it can be a dewatering centrifuge of the type which will produce a cake and a centrate, for instance a KHD Humboldt or Alfa Laval Sharples (trade names) centrifuge. Alternatively it can be a belt press or a plate and frame press. Novel apparatus according to the invention comprises any such dewatering apparatus (equipped with its conventional inlet feed line and outlet reject liquor line) wherein means for recycling a controlled proportion of reject liquor are provided leading from the outlet reject liquor line to the inlet feed line. This means may comprise suitable valving and flow meters and other control means for diverting a controlled proportion of the reject liquor back into the inlet in response either to manual operation or to automated operation, for instance automated in response to measurement of the rate of flow or the solids content, or both, of the sludge approaching the dewatering apparatus.

The sludge can be any conventional type of sewage sludge and is frequently a blend of primary and secondary sludges. The sludge which is fed to the dewatering process usually has a solids content above 0.5 or 1% by weight and usually above 2 or 3%. Generally it is not more than about 5 or 6% but in some instances it can be as much as 8% or even 10%, depending upon the nature of the sludge.

If the sludge, as initially supplied from the primary and/or secondary stages, does not have appropriate solids content then the solids content may be adjusted before approaching the dewatering process of the invention. This adjustment may be by dilution or by thickening. The thickening can be assisted by the use of a polymeric flocculant. The thickening results in the formation of a filtrate or supernatant (which is usually recycled to the head of the plant) and the thickened sludge which is then used in the invention. The thickening can be by, for instance, sedimentation, gravity filtration or centrifuging and results in the production of a thickened sludge (in contrast to the dewatering process of the invention which produces a cake).

The polymeric flocculant can be a single polymer added at one or more dosage points or it can be different polymers, generally added sequentially. It may be used in combination with an inorganic coagulant, in known manner. Usually part or all of the polymeric flocculant is a water soluble synthetic polymer usually formed from a water soluble ethylenically unsaturated monomer or monomer blend. It may be anionic, non-ionic or cationic. Often the flocculant is formed from a blend of non-ionic monomer (such as acrylamide) and cationic monomer, such as dialkylaminoalkyl (meth)-acrylate or -acrylamide or diallyl dimethyl ammonium chloride). However any of the other conventional cationic or anionic or non-ionic sludge flocculants can be used in the invention. The molecular weight of synthetic polymers used as flocculant is usually high, for instance indicated by an intrinsic viscosity (suspended level viscometer at 20° C. in 1N sodium chloride solution buffered to pH7) above 4 and often 6 to 30 dl/g, usually 6 to 15 dl/g when the polymer is cationic and 10 to 30 dl/g when it is non-ionic or anionic.

The polymer is usually provided initially to the plant as powder or reverse phase emulsion (which can be anhydrous) and is usually activated in water before addition to the sludge, all in conventional manner. As indicated above, some or all of the water used for the activation can be part or all of the reject liquor recycle.

The invention also provides, in a second aspect, an improved thickening process for sewage sludge comprising
providing a sewage sludge,
mixing polymeric flocculant into the sludge at a dosing point and then
substantially immediately subjecting the sludge to a thickening process and thereby forming a thickened sludge and a reject liquor, wherein
30 to 40% by volume of the reject liquor is recycled directly into the sludge at a dilution point substantially immediately before the dewatering process and before the flocculant dosing point.

In this aspect of the invention improvements are found in thickening processes by using a principle similar to that of the first aspect of the invention for dewatering. All process features of the dewatering process of the invention may be applied to the thickening process of the invention where relevant.

The invention also provides, in a third aspect, a process for improved dewatering of a cellulosic sludge comprising
providing a cellulosic sludge,
mixing polymeric flocculant into the sludge at a dosing point and then
substantially immediately subjecting the sludge to a dewatering process and thereby forming a cake and a reject liquor, wherein
3 to 40% by volume of the reject liquor is recycled into the sludge at a dilution point substantially immediately before the dewatering process.

In this aspect of the invention the cellulosic sludge can be for instance paper mill effluent sludge or de-inking plant sludge.

All process features of the dewatering process of the first aspect of the invention may be applied to the dewatering process of the third aspect of the invention where relevant.

The invention is illustrated in the accompanying drawings in which

Figure 2:
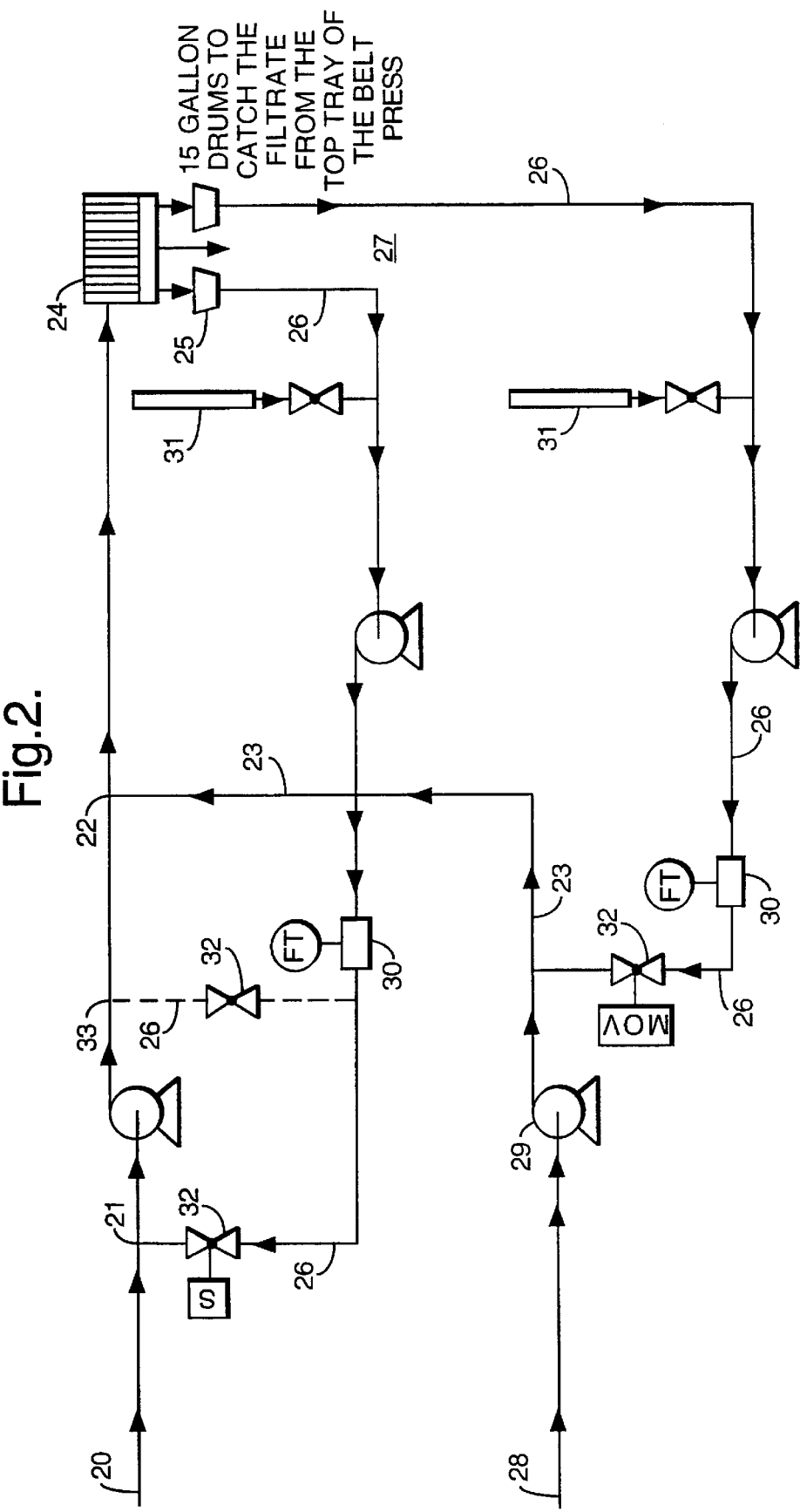

FIG. 1 is a schematic representation of a typical sewage treatment plant showing, in dashed lines, the modification of the plant in accordance with the invention and FIG. 2 is a schematic representation of a dewatering plant according to the invention.

Referring to FIG. 1, raw sewage enters at 1 and passes through various steps including primary clarification 2, secondary biological processing 3, secondary clarification 4, sludge thickening 5, sludge digestion 6 and sludge dewatering 7. Some primary sludge from the primary clarification is sent directly to the feed line to the sludge digestion process 6 whilst the remainder passes to secondary biological processing 3. Secondary clarification 4 produces waste activated sludge of which some passes to sludge thickening 5 (for which purpose polymer is added to the sludge line) and some is sent back into the feed line for secondary biological processing. Reject liquor from secondary clarification 4 is passed to tertiary filtration 8 and disinfection 9 before discharge as plant effluent. The sludge dewatering process produces a sludge cake which can be disposed of in various ways and a reject liquor which is passed back to the head of the plant at 1. Similarly excess reject liquor from the sludge thickening process is passed to the head of the plant 1. The dotted lines show the recycling of reject liquor from sludge dewatering 7 to the sludge line entering sludge dewatering.

The sludge from the primary and secondary sedimentation stages is blended and, as shown in FIG. 2, is pumped along a sludge feed line 20 by a sludge pump 21 past a polymer dosing point 22 at which dissolved polymer is supplied from a line 23, from a polymer solution feed 28 and via a polymer solution feed pump 29. The addition of the polymer into the sludge line is conducted in conventional manner so as to obtain rapid mixing of the polymer into the sludge as it flows along the line towards a dewatering apparatus 24. It enters this at an inlet 25. Reject liquor is taken out of the dewatering apparatus by outlet line 26. Removal means can include drums (not shown). Cake is removed in conventional manner by cake removal means shown diagrammatically as 27. In accordance with the invention, recycle is provided between the outlet line 26 and the sludge line 20, and in the illustration the recycle is to the suction side of the sludge pump 21. It is also possible to recycle to the discharge side of the pump 21 at point 33 (shown as a dotted line). Recycle is also shown to the polymer line 23. Each recycle line 26 is provided with a valve 32 which enables switching off of that recycle, and if desired with a flowmeter 30 and calibration cylinder for control purposes. In order to control the amount of recycle, suitable control apparatus comprises a variable speed progressive cavity pump controlled manually or automatically through the feedback signal of a flow measuring device or solids sensing device mounted on the sludge feed line.

The following are examples of the invention.

EXAMPLE 1

A mixture of primary and secondary sludge was being pumped at 150 gallons per minute along a sludge line to a centrifugal dewatering apparatus, with the addition of 25 gallons per minute of potable water to the sludge line so as to reduce the viscosity of the sludge and with the addition as solution of 22.6 pounds polymer per dry ton of sludge as flocculant. The polymer was a copolymer of acrylamide and dialkylaminoalkyl acrylate quaternary salt having IV in the range 6 to 12. The amount of the polymer had been optimised so as to provide cake solids which, on a general basis, were about 18 to 20% and good centrate clarity. 22 gallons per minute of the centrate were then recycled into the sludge line as a replacement for the 25 gallons per minute potable water and the amount of polymer was reduced to about 15 pounds, a reduction of almost 30%. Cake solids dropped from a value of about 20% immediately before the change to about 18% and the centrate clarity was excellent. The recycle was then terminated and replaced by dilution with 25 gallons per minute potable water and the amount of polymer was increased back to about 18 pounds, whereupon the cake solids increased by less than 1%.

This trial shows that cake solids can be maintained at about the previous level while reducing the polymer dosage significantly if the dilution with potable water is replaced by recycle of centrate. In this particular example the amount of recycle is about 15% by volume.

Interestingly, attempts to reproduce these results by laboratory tests failed, but it is not clear whether this was due to a temporary failure in the laboratory techniques or whether it is indicative of the invention relying, in some unexplained manner, on the dynamics and other plant process conditions that prevail during an actual dewatering process on a plant. In this plant, the dewatering was by a centrifuge.

EXAMPLE 2

Dewatering was being carried out on a mixture of primary and secondary sludge having a solids content of around 5 to 6% using dewatering plant in which the dewatering apparatus was a belt press. The process was operating under conditions which the plant considered to be optimum, utilising no dilution water but the addition of 4.8 pounds per dry ton of a high molecular weight cationic polymeric flocculant added as a solution.

Trials were conducted on three consecutive days, and in each instance the trial consisted of operating under optimum conditions without dilution water or recycle of filtrate followed by recycle of filtrate (in amounts of around 17 to 21%) at the same or decreased polymer dosage, and the cake solids was observed. In each instance the filtrate clarity was also observed and was maintained acceptable throughout. The recycle of filtrate was made to the suction side of the sludge pump. The results are set out in the following table.

| Sludge Feed Rate (gpm) | Feed Solids (% T.S.) | Polymer Dosage (lb/dry ton) | Recycle (gpm) | Cake Solids (% T.S.) |
|---|---|---|---|---|
| 90.0 | 5.54 | 4.81 | 0 | 29.72 |
| 97.0 | 5.52 | 4.81 | 17.4 | 32.98 |
| 97.0 | 5.21 | 3.85 | 17.4 | 28.89 |
| 88.0 | 4.2 | 5.87 | 0 | 26.18 |
| 93.0 | 4.2 | 5.87 | 19.6 | 29.46 |
| 93.0 | 4.36 | 4.76 | 19.6 | 25.31 |
| 90.0 | 3.44 | 4.9 | 0 | 24.99 |
| 97.0 | 3.44 | 4.9 | 19.2 | 28.31 |

It is apparent from these results that the recycle gave increased cake solids when the polymer dosage was unchanged or equivalent cake solids at reduced polymer dosage. In particular increases in cake dryness, at unchanged polymer dosage, of around 11, 12 and 13% were recorded, and reductions in polymer dosage of around 7 and 19% were recorded at equivalent cake solids.

What is claimed is:

1. A sewage sludge treatment process comprising
   a) pumping sewage sludge with a sludge pump through a sludge line to a dewatering apparatus
   b) mixing polymeric flocculant into the sludge at a dosing point in said sludge line and then
   c) substantially immediately subjecting the sludge to a dewatering process in said dewatering apparatus and thereby forming a cake and reject liquor, wherein 3 to 40% by volume of the reject liquor is recycled into the sludge line at a suction or discharge side of said sludge pump at a dilution point substantially immediately before the dewatering process, in which the amount of polymeric flocculant dosed into the sludge is no more than the optimum dose of that flocculant for that sludge in that process without the recycling of the reject liquor.

2. A process according to claim 1 in which the dewatering is by centrifugation, filter pressing or belt pressing.

3. A process according to claim 1 in which the amount of reject liquor which is recycled is 5 to 20% by volume of the reject liquor.

4. A process according to claim 1 in which the amount of reject liquor which is recycled is controlled automatically in response to the flow rate of the sludge to the dewatering apparatus and/or to the solids content of the sludge.

5. A process according to claim 1 in which the reject liquor is recycled to the suction side of the sludge pump.

6. A process according to claim 1 in which the recycle is to a position at which the sludge is within 10 minutes of being subjected to the dewatering process.

7. A sewage sludge thickening process comprising
   a) pumping sewage sludge with a sludge pump through a sludge line to a thickening apparatus,
   b) mixing polymeric flocculant into the sludge at a dosing point in said sludge line; and then
   c) substantially immediately subjecting the sludge to a thickening process in said thickening apparatus and thereby forming a thickened sludge and a reject liquor, wherein 3 to 40% by volume of the reject liquor is recycled into the sludge line at a suction or discharge side of said sludge pump at a dilution point substantially immediately before the thickening process and before the flocculant dosing point, in which the amount of polymeric flocculant dosed into the sludge is no more than the optimum dose of that flocculant for that sludge in that process without the recycling of the reject liquor.

8. A cellulosic sludge treatment process comprising pumping cellulosic sludge with a sludge pump through a sludge line to a dewatering apparatus, mixing polymeric flocculant into the sludge at a dosing point in said sludge line and then substantially immediately subjecting the sludge to a dewatering process in said dewatering apparatus and thereby forming a cake and reject liquor, wherein 3 to 40% by volume of the reject liquor is recycled into the sludge line at a suction or discharge side of said sludge pump at a dilution point substantially immediately before the dewatering process.

* * * * *